No. 741,691. PATENTED OCT. 20, 1903.
W. F. MORSE.
CORNER STAYING MACHINE.
APPLICATION FILED MAR. 13, 1902.
NO MODEL. 10 SHEETS—SHEET 1.

WITNESSES: INVENTOR
Chas. J. Joner William F. Morse.
Wm. T. Brewer. BY
Hoey & Parsons.
ATTORNEYS

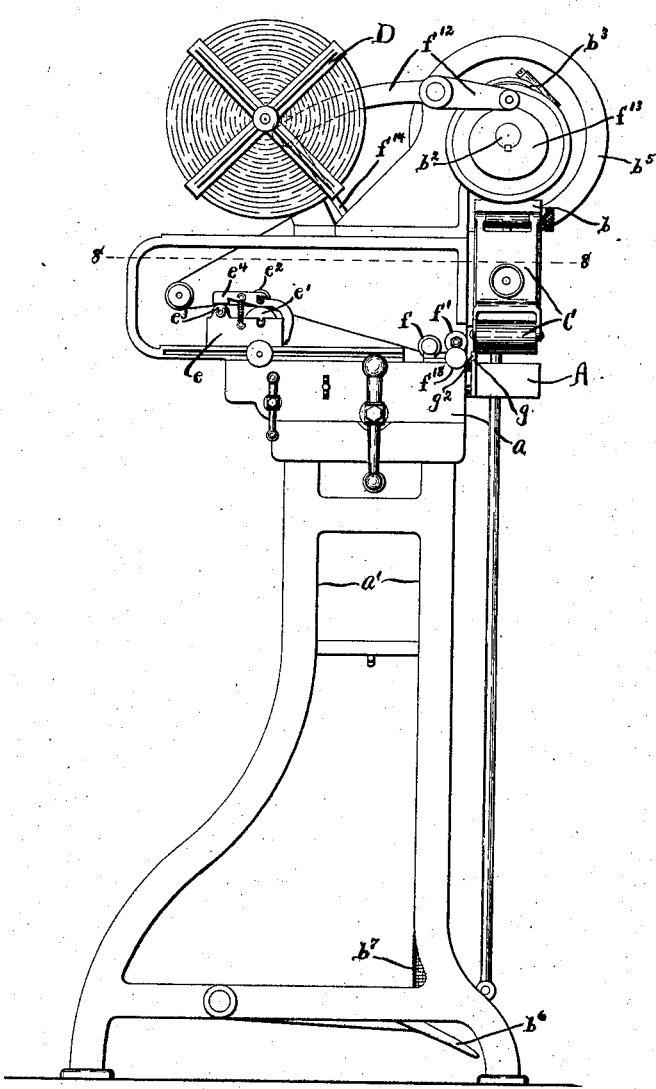

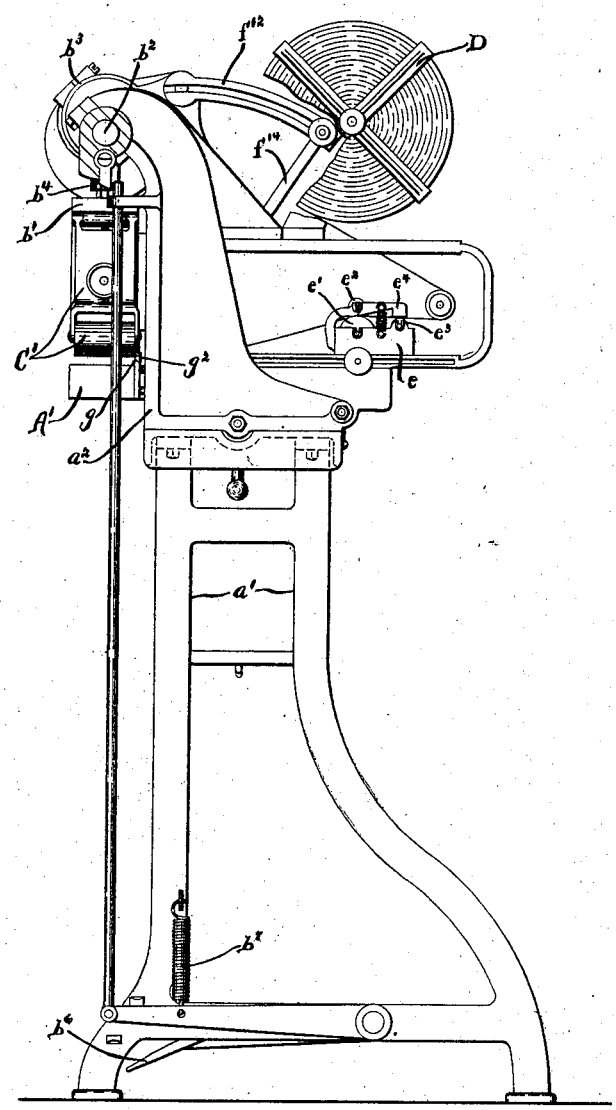

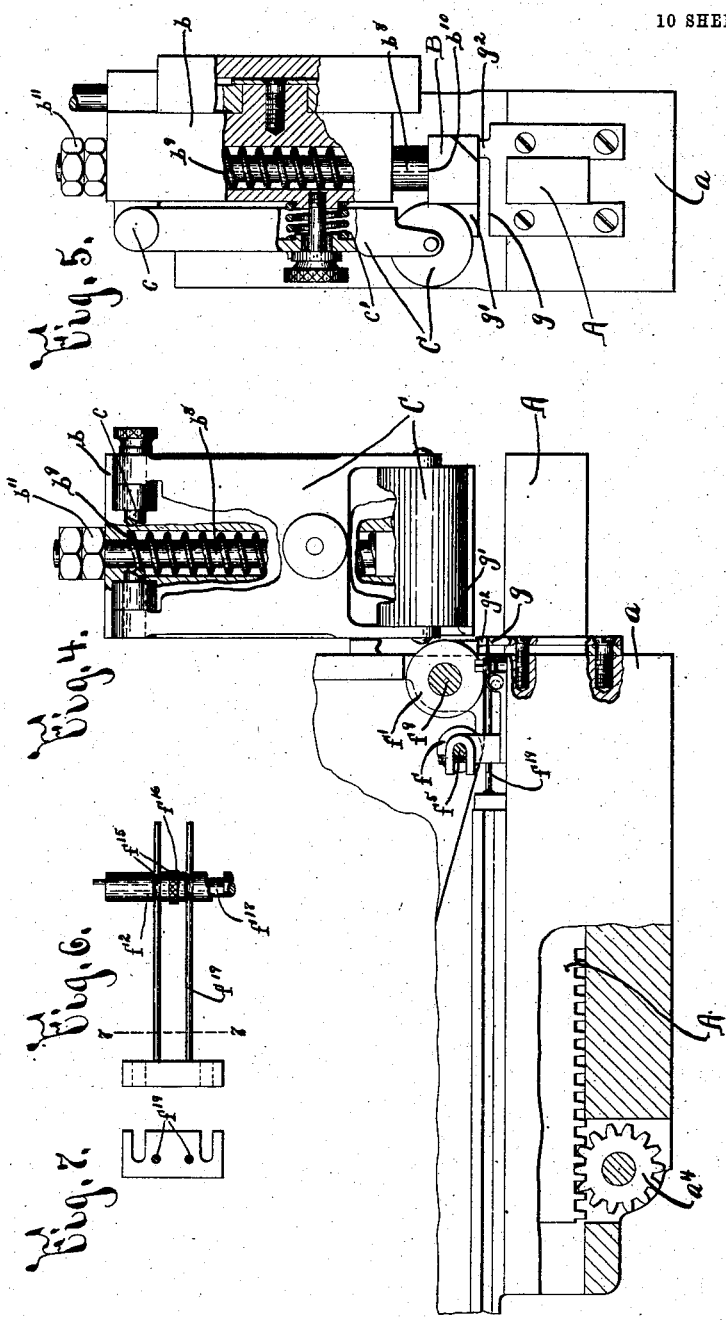

No. 741,691. PATENTED OCT. 20, 1903.
W. F. MORSE.
CORNER STAYING MACHINE.
APPLICATION FILED MAR. 13, 1902.
NO MODEL. 10 SHEETS—SHEET 5.
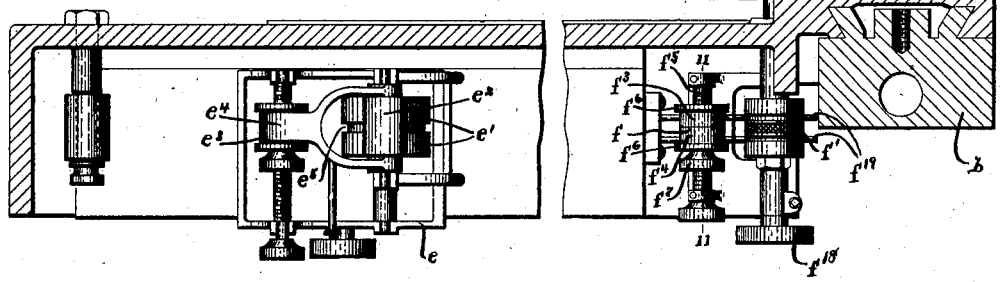
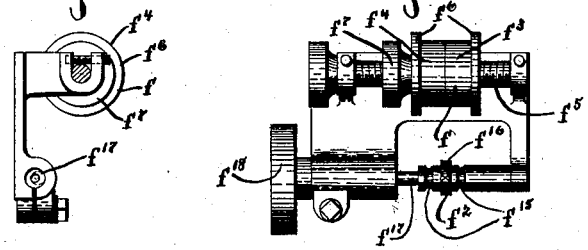
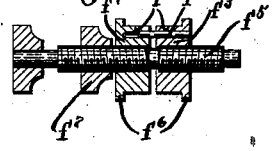
WITNESSES:
Chas. J. Jones.
Wm. T. Brewer.
INVENTOR
William F. Morse.
BY
Sbey & Parsons.
ATTORNEYS No. 741,691. PATENTED OCT. 20, 1903.
W. F. MORSE.
CORNER STAYING MACHINE.
APPLICATION FILED MAR. 13, 1902.
NO MODEL. 10 SHEETS—SHEET 6.

WITNESSES:
Chas. J. Foner.
Wm. T. Brewer

INVENTOR
William F. Morse.
BY
Hoey & Parsons.
ATTORNEYS

No. 741,691. PATENTED OCT. 20, 1903.
W. F. MORSE.
CORNER STAYING MACHINE.
APPLICATION FILED MAR. 13, 1902.
NO MODEL. 10 SHEETS—SHEET 7.

WITNESSES:
Chas. J. Foner.
Wm. T. Brewer.

INVENTOR
William F. Morse.
BY
Hoyt Parsons,
ATTORNEYS

No. 741,691. PATENTED OCT. 20, 1903.
W. F. MORSE.
CORNER STAYING MACHINE.
APPLICATION FILED MAR. 13, 1902.
NO MODEL. 10 SHEETS—SHEET 8.

WITNESSES: INVENTOR
Chas. J. Jones. William F. Morse.
Wm. T. Brewer. BY
Steyr Parsons,
ATTORNEYS No. 741,691. PATENTED OCT. 20, 1903.
W. F. MORSE.
CORNER STAYING MACHINE.
APPLICATION FILED MAR. 13, 1902.
NO MODEL. 10 SHEETS—SHEET 10.

WITNESSES: INVENTOR
Chas. J. Jones. William F. Morse.
Wm. T. Brewer. BY
Hays & Parsons.
ATTORNEYS No. 741,691. Patented October 20, 1903.

UNITED STATES PATENT OFFICE.

WILLIAM F. MORSE, OF ROCHESTER, NEW YORK, ASSIGNOR TO SAMUEL R. PARRY, OF ROCHESTER, NEW YORK.

CORNER-STAYING MACHINE.

SPECIFICATION forming part of Letters Patent No. 741,691, dated October 20, 1903.

Application filed March 13, 1902. Serial No. 98,047. (No model.)

*To all whom it may concern:*

Be it known that I, WILLIAM F. MORSE, of Rochester, in the county of Monroe and State of New York, have invented a certain new and useful Corner-Staying Machine, of which the following is a specification.

My invention has for its object the production of a corner-staying machine which is particularly simple in construction and efficient in operation; and to this end it consists in the combination, construction, and arrangement of the component parts of a corner-staying machine, as hereinafter fully described, and pointed out in the claims.

In describing this invention reference is had to the accompanying drawings, in which like letters indicate corresponding parts in all the views.

Figure 1:
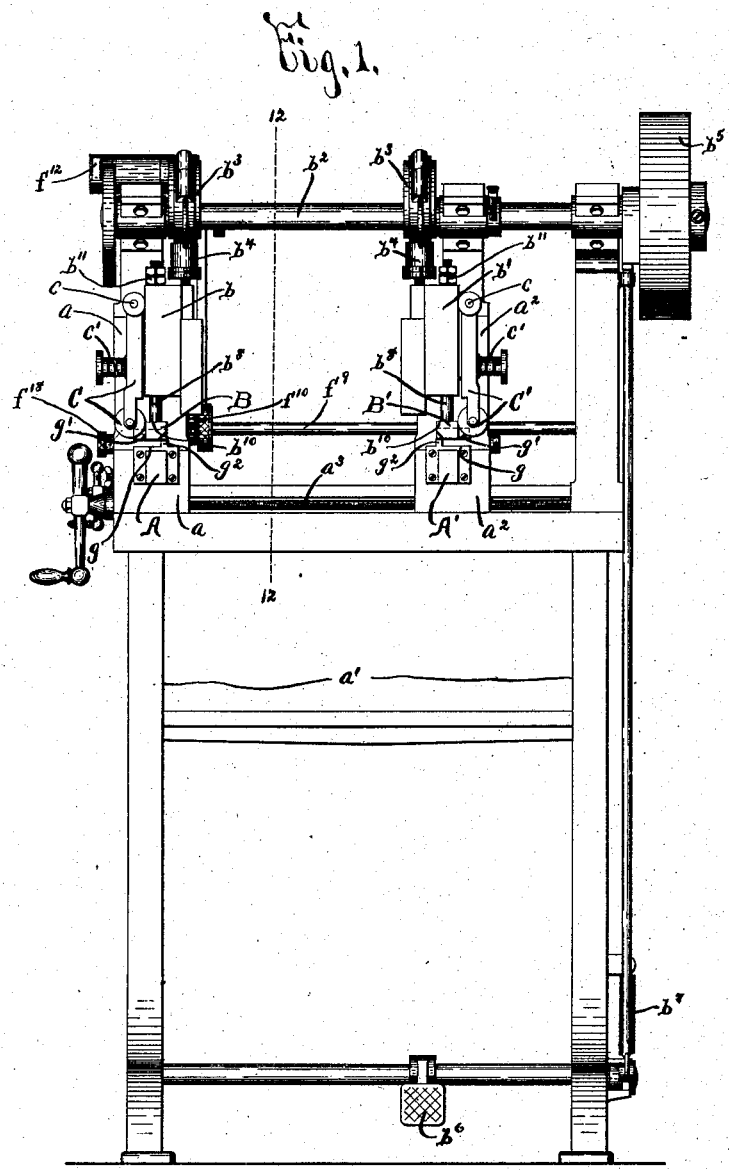
Figure 12:
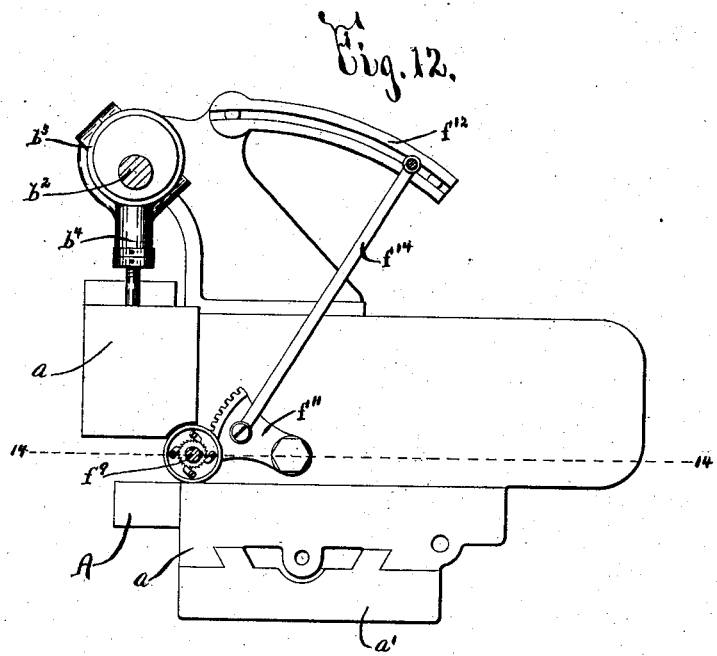
Figure 13:
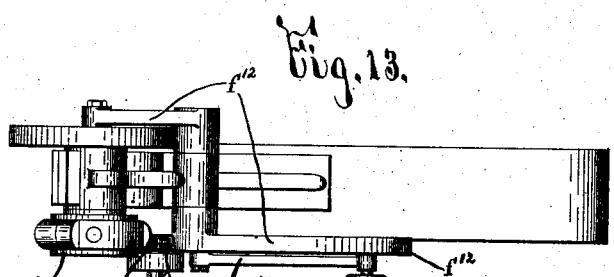
Figure 14:
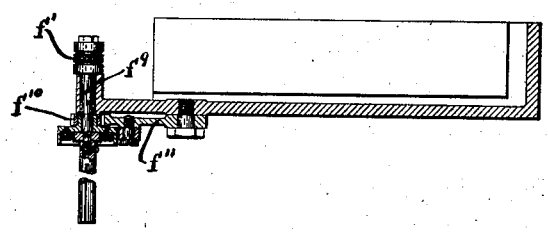
Figure 17:
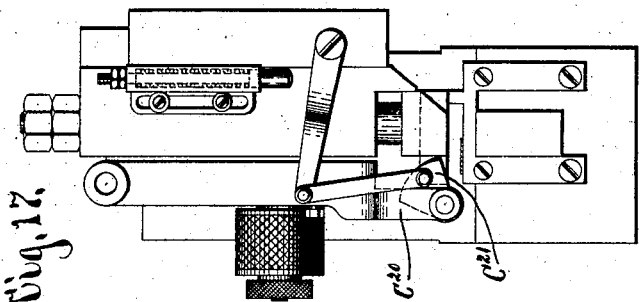
Figure 16:
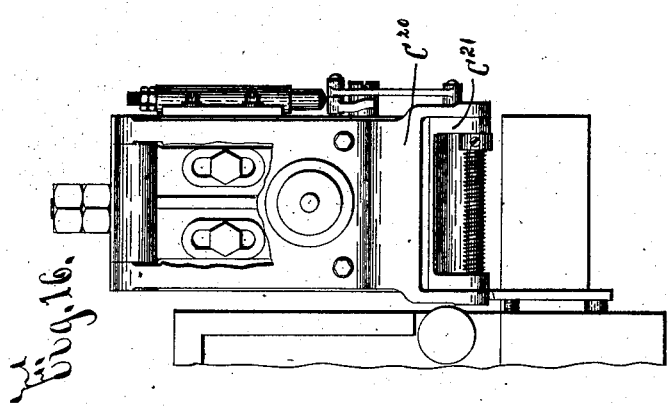
Figure 15:
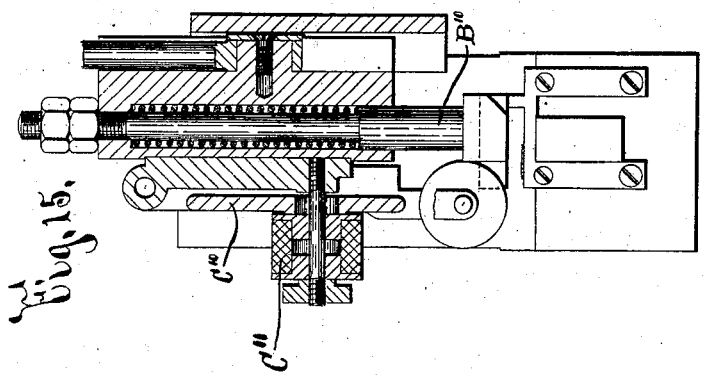
Figure 18:
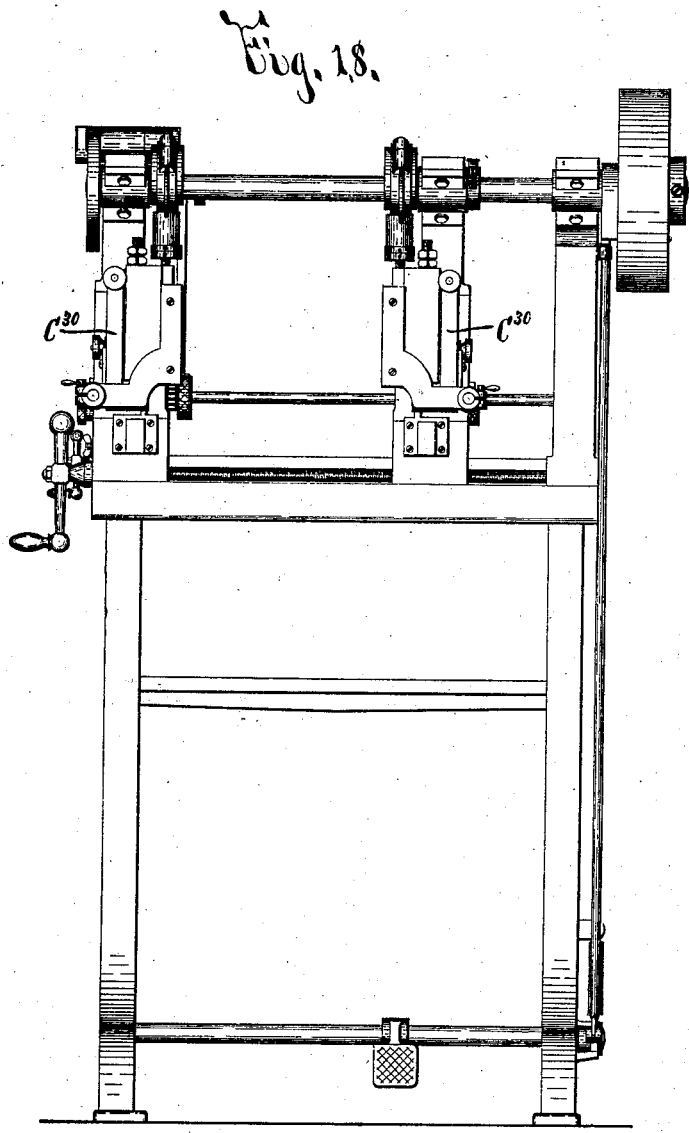
Figure 19:
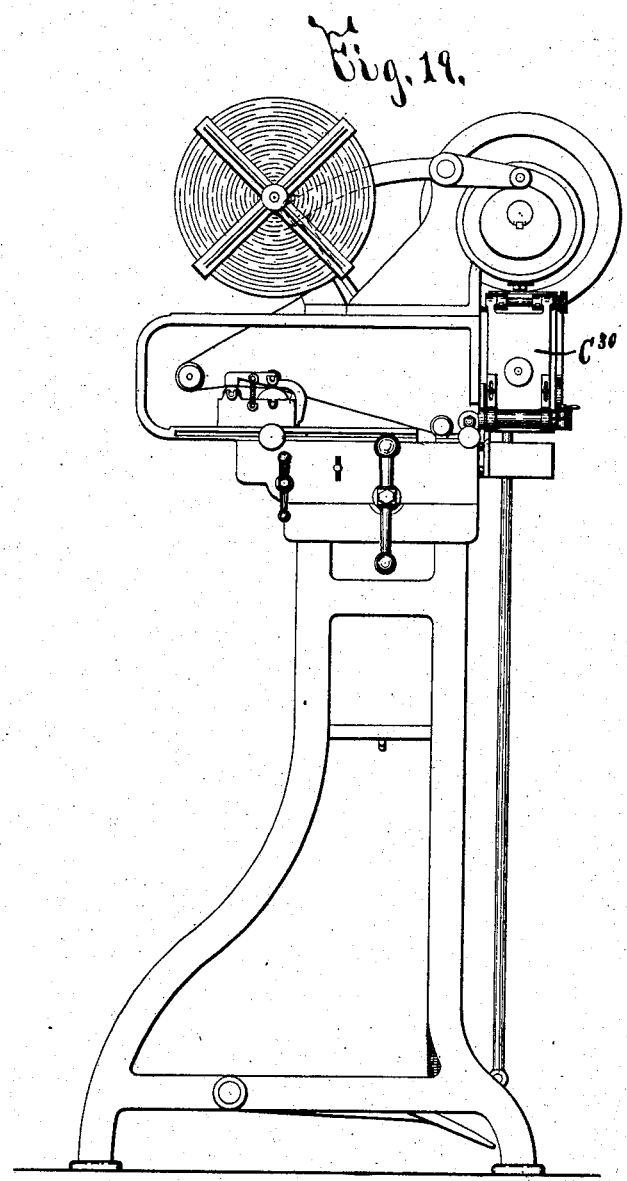
Figure 20:
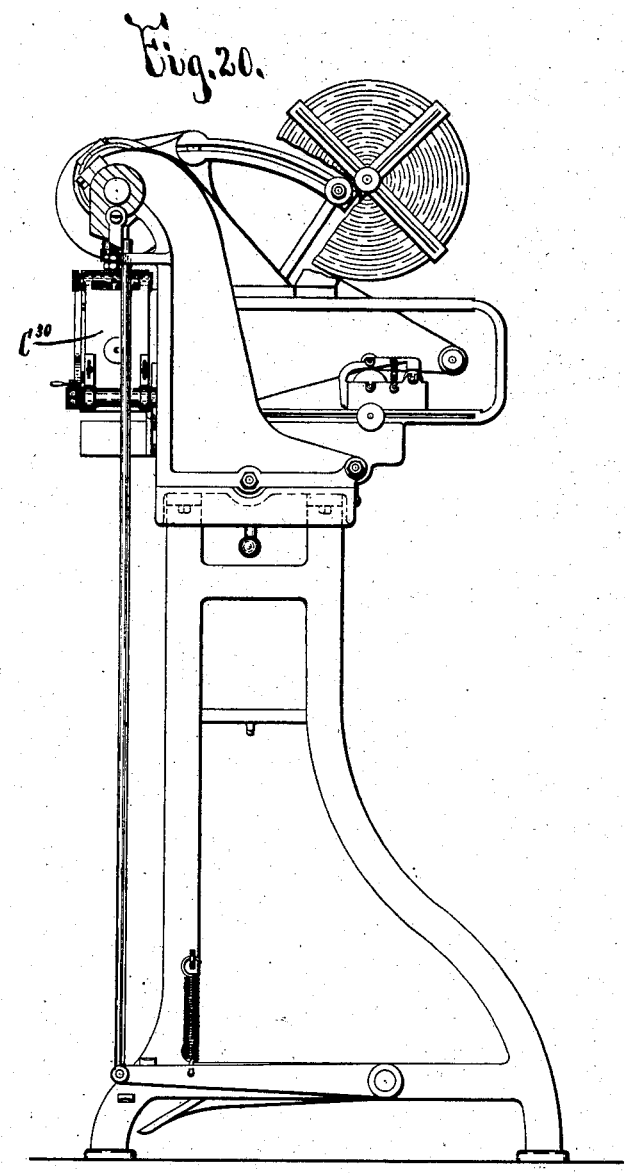

Figures 1, 2, and 3 are respectively front and opposite side elevations of a preferable embodiment of my invention. Figs. 4 and 5 are respectively side and front elevations, partly broken away and in section, of a support for a corner, the corresponding plungers for affixing stays to the corner, and contiguous parts of the machine. Fig. 6 is an inverted plan of a portion of the feeding device for one of the adhesive strips and the corresponding separated bars for supporting said strip when in proximity to the knives which cut the same into pieces or stays. Fig. 7 is a vertical sectional view taken on line 7 7, Fig. 6. Fig. 8 is a horizontal sectional view taken on line 8 8, Fig. 2, parts of the machine being omitted. Fig. 9 is a top plan of a portion of the feeding device for one of the adhesive strips. Fig. 10 is a side elevation of a part of the means shown in Fig. 9, said part being illustrated as in a vertical plane instead of in its normal horizontal plane. Fig. 11 is a sectional view taken on line 11 11, Fig. 8, of one of the rollers of the feeding device shown in said Fig. 8, the sections of said roller being slightly separated. Fig. 12 is a vertical sectional view, taken on line 12 12, Fig. 1. Fig. 13 is a top plan of parts shown in Fig. 12. Fig. 14 is a horizontal sectional view taken on line 14 14, Fig. 12. Fig. 15 is a vertical sectional view, partly in elevation, of a portion of a modified construction of my corner-staying machine. Figs. 16 and 17 are respectively front and side elevations of a portion of an additional embodiment of my invention. Figs. 18, 19, and 20 are respectively front and opposite side elevations of a further modified construction of said invention.

The illustrated embodiment of my invention comprises a pair of supports A A' for opposite corners, one of the supports being adjustable toward and away from the other, opposite pairs of plungers B C B' C', one pair for each support, and means for supplying adhesive pieces or stays to the corners. It will be obvious, however, to those skilled in the art that one of said supports and the corresponding pair of plungers may be dispensed with, if desired. Said supports A A' preferably project beyond the front faces of an upright $a$, fixed to a suitable frame $a'$ and a carriage $a^2$, movable crosswise of the frame $a'$ toward and away from the upright $a$ by any desirable means, as a feed-screw $a^3$. The supports A A' are generally movable lengthwise by any suitable means, as a gear-wheel $a^4$, Fig. 4, for varying the amount of projection of the supports beyond the front faces of the upright $a$ and the carriage $a^2$ in conformity with the depth of the box to be provided with stays, it being understood that the contiguous edges of sides of the box ordinarily engage the front faces of said upright and carriage. Said supports A A' are usually of rectangular cross-section and are arranged with their top engaging faces in substantially the same horizontal plane.

The pairs of plungers B C B' C' are preferably actuated by heads $b$ $b'$, which are movable toward and away from the supports A A' and are respectively guided on the upright $a$ and the carriage $a^2$. The means for moving the heads $b$ $b'$ toward and away from the supports A A' is here shown as a rotary shaft $b^2$, a pair of eccentrics $b^3$ on the shaft $b^2$, and links $b^4$, connecting said heads and eccentrics. The eccentric $b^3$ for actuating the plungers B' C' may be disconnected at will, as will be obvious to those skilled in the art, when it is desired to attach stays to but one corner at a time. Said shaft $b^2$ remains stationary when the machine is not in operation and is connected to a constantly-rotating pulley $b^5$ by a suitable clutch mechanism, (not illustrated,) which is incased by said pulley, is forced into its operative position by a pedal $b^6$, pivoted to the frame $a'$, and is returned to its inoperative position by a spring $b^7$, connected to said pedal.

As clearly shown in the drawings, the lower or working faces of the plungers B C B' C' are disposed in substantially the same horizontal plane above and substantially parallel with and equidistant from the plane of the upper faces of the supports A A', with the contiguous surfaces of each pair of said plungers in substantially vertical alinement with the outer substantially vertical side face of the corresponding support. In the preferable embodiment of my invention the lower or working faces of the plungers B B' are substantially flat, and the corresponding faces of the plungers C C' consist of the peripheries of engaging parts or rollers, which are journaled in the lower ends of the main bodies of said plungers C C', are movable on axes relatively to the main bodies of the plungers C C', and are arranged with the advance portions of their working faces normally separated substantially the same distance from the plane of the engaging faces of the supports A A' as the working faces of the plungers B B'. When the heads $b$ $b'$ descend, the plungers B C B' C' move downwardly simultaneously in substantially parallel planes until the lower or working faces of the inner plungers B B' coöperate with the upper or engaging faces of the supports A A' and arrest the movement of the plungers B B', and as said heads continue their downward movement the outer plungers C C' move along the outer side faces of the supports A A' and depress the lower or working faces of said plungers C C' below the corresponding faces of the plungers B B'. Said plungers B B' are reciprocally movable relatively to the heads $b$ $b'$, being here shown as provided with rods $b^8$, encircled by springs $b^9$, which hold the plungers B B' in their depressed position relatively to the heads $b$ $b'$, transmit motion from the heads $b$ $b'$ to the plungers B B' as the heads descend, and permit said heads to continue their downward movement after the plungers B B' reach the limit of their movement toward the supports A A'. The plungers B B' are provided with shoulders $b^{10}$, which are engaged by the heads $b$ $b'$ as said heads reach the limit of their movement toward the supports A A', and the upper ends of the plunger-rods $b^8$ are provided with shoulders $b^{11}$ for limiting the downward movement of the plungers B B' relatively to the heads $b$ $b'$.

The upper ends of the plungers C C' are pivoted at $c$ to the heads $b$ $b'$, and the lower ends of said plungers are movable laterally toward and away from the lower ends of the plungers B B' for forcing the lower or working faces of the plungers C C' toward and away from the corresponding faces of the plungers B B'. Said lower ends of the plungers C C' are held in their normal position relatively to the corresponding ends of the plungers B B' by suitable yielding means, as springs $c'$.

The means for supplying adhesive pieces or stays to the corners on the supports A A' consists of reels D for adhesive strips, devices for moistening the strips, devices for feeding said strips, and means for cutting the strips into small pieces or stays. The reels D are of any desirable form, size, and construction. As here illustrated, the devices for moistening the strips each consist of a fluid-containing reservoir $e$, adjustable on the frame $a'$ and suitably secured thereto, a roller $e'$, movable in the reservoir $e$ and engaging the lower face of the corresponding adhesive strip for applying a moistening fluid thereto, upper and lower rollers $e^2$ $e^3$, and an arm $e^4$ for forcing the adhesive strip against the roller $e^3$. Said roller $e'$ is provided with a groove $e^5$, Fig. 8, in its periphery in order that the portion of the adhesive strip movable in alinement with this groove may be unprovided with the moistening fluid. The roller $e'$ thus moistens separated portions of the adhesive strip.

The devices for feeding the adhesive strips are each provided with upper and lower rollers $f$ $f'$ $f^2$. The upper roller $f$ usually consists of separable sections $f^3$ $f^4$, adjustable lengthwise of reversely-threaded portions of the supporting-spindle $f^5$ for said roller and having their outer sides provided with peripheral flanges $f^6$. Said sections $f^3$ $f^4$ are held in position by any desirable means, as a nut $f^7$, engaged with one of the sections, and a dowel-pin $f^8$, projecting from one section into a socket in the contiguous face of the other section. Said other upper roller $f'$ is generally formed with annular grooves and an intermediate part having a knurled periphery of comparatively narrow width for engaging the upper surface of the portion of the adhesive strip unprovided with the moistening fluid, and is mounted on a shaft $f^9$, journaled in fixed bearings and having one end suitably connected to the shaft $b^2$ by means which intermittently advances said shaft $f^9$ and is here shown as a gear-wheel $f^{10}$, connected to the shaft $f^9$ by pawls and a ratchet-wheel, Fig. 12, a rocking part, as a toothed segment $f^{11}$, engaging the gear-wheel $f^{10}$, a pivoted lever $f^{12}$, having one end actuated by a cam $f^{13}$ on the shaft $b^2$, and a link $f^{14}$, having one end connected to the segment $f^{11}$ and its other end adjustable lengthwise of the lever $f^{12}$ for regulating the amount of movement of the rocking segment $f^{11}$ upon each revolution of the shaft $b^2$. The lower roller $f^2$ is preferably provided with separated annular grooves $f^{15}$, Fig. 6, and with an enlarged part $f^{16}$, which is arranged between the grooves $f^{15}$, is formed with a knurled periphery, is of comparatively narrow width, and engages the portion of the lower face of the adhesive strip unprovided with the moistening fluid, thus insuring a positive feeding movement of said strip. The spindle for the roller $f^2$ is journaled in supporting-bearings and is provided with an eccentrically-arranged portion $f^{17}$, forming a bearing for the roller $f^2$, and with a hand-wheel $f^{18}$ for enabling the operator to rotate the spindle in its bearings, and thereby force the roller $f^2$ toward or away from the superimposed roller $f'$ and vary the frictional hold of said rollers $f' f^2$ upon the adhesive strip. The adhesive strips when engaged by the feeding device are usually supported by separated bars $f^{19}$, which extend parallel with the path of movement of the adhesive strips, register with the annular grooves of the rollers $f' f^2$, and terminate in proximity to the knives $g'$.

The means for cutting the adhesive strips into pieces or stays is here illustrated as knives $g$ $g'$, fixed, respectively, to the supports A A' and the plungers B B'. The knives $g'$ may be guided in their movement by arms $g^2$, projecting upwardly and rearwardly from the supports A A'.

In order that it may be obvious to those skilled in the art that the construction and arrangement of the component parts of my corner-staying machine may be varied more or less, I have shown modified constructions of said machine in Figs. 15 to 20, inclusive. A pivoted plunger $C^{10}$ is illustrated in Fig. 15 as connected to a piece of rubber $C^{11}$ for forcing the lower end of said plunger toward the corresponding end of the plunger $B^{10}$. A pivoted plunger $C^{20}$ is shown in Figs. 16 and 17 as provided at its lower end with a rocking engaging part or segment $C^{21}$, the curved surface of which forms the engaging face of said plunger, and a complete machine is illustrated in Figs. 18 to 20, inclusive, which is provided with pivoted plungers $C^{30}$, having their lower or engaging faces formed flat instead of curved.

In the operation of my staying-machine the carriage $a^2$ is adjusted toward or away from the upright $a$ in conformity with the length of the sides of the boxes to be stayed, the supports A A' are moved lengthwise, so as to project the requisite distance beyond the front faces of the upright $a$ and the carriage $a^2$, and the link $f^{14}$ is adjusted to cause the rollers $f' f^2$ to feed the desired amount of the adhesive strips before the operation of the knives $g$ $g'$. Upon each depression of the pedal $b^6$ the shaft $b^2$ is locked to the pulley $b^5$ and the heads $b$ $b'$ are reciprocated toward and away from the supports A A', thus severing the adhesive strips into pieces or stays and attaching the same to the corners of the boxes. In the operation of attaching the adhesive pieces or stays the plungers B B' press the inner side portions of the pieces or stays upon the ends of the upper faces of the boxes, and the plungers C C' roll the outer portions of said pieces or stays upon the sides of the boxes.

My corner-staying machine will now be readily understood upon reference to the foregoing description and the accompanying drawings, and it will be particularly noted that more or less change may be made in the construction and arrangement of the component parts thereof without departing from the spirit of my invention.

Having thus fully described my invention, what I claim as new, and desire to secure by Letters Patent, is—

1. The combination of a plunger, a support having an engaging face for coöperating with a working face of the plunger and arresting the movement of said plunger, a second plunger consisting of a main body, and an engaging part movable on an axis relatively to the main body and provided with a working face for coöperating with the support, said engaging part having the advance portion of its working face normally arranged substantially the same distance from the plane of said engaging face of the support as the working face of the first plunger, and means for moving both plungers toward and away from the support and for continuing the advance movement of the second plunger relatively to the first plunger after the working face of said first plunger has clamped upon the support the article to be operated upon, substantially as and for the purpose described.

2. The combination of a reciprocating head, a plunger carried by the head, a support having an engaging face for coöperating with a working face of the plunger and arresting the movement of said plunger, a connection between the head and the plunger for permitting the head to continue its advance movement after the plunger is arrested, and a second plunger consisting of a main body, and an engaging part movable on an axis relatively to the main body and provided with a working face for coöperating with the support, said engaging part having the advance portion of its working face normally arranged substantially the same distance from the plane of said engaging face of the support as the working face of the first plunger, and said main body being connected to the head and movable by said head during the complete movement thereof for causing the working face of the engaging part to advance beyond the working face of the first plunger after the movement of said first plunger is arrested, substantially as and for the purpose set forth.

3. The combination of a plunger, a support having a substantially horizontal engaging face for coöperating with a working face of the plunger and arresting the movement of the plunger, said support also having a substantially vertical engaging face, a second plunger consisting of a main body, and an engaging part supported by the main body and movable on an axis relatively thereto, said engaging part being provided with a working face for coöperating with the substantially vertical face of the support and having the advance portion of its working face normally arranged in substantially the same horizontal plane as the working face of the first plunger, and means for moving both plungers toward and away from the support and for continuing the advance movement of the second plunger relatively to the first plunger after the movement of said first plunger is arrested, and thereby moving the working face of the engaging part along the substantially vertical face of the support, substantially as and for the purpose set forth.

4. The combination of a support, a pair of plungers movable toward and away from the support and coöperating therewith, one of the plungers having the part thereof provided with the working face of said plunger movable laterally toward and away from the contiguous portion of the other plunger, and yielding means for forcing said laterally-movable part toward the contiguous portion of the other plunger, substantially as and for the purpose described.

5. The combination of a plunger, a support having an engaging face for coöperating with an opposing face of the plunger and arresting the movement of said plunger, a second plunger provided with a working face for coöperating with the support and having said working face normally separated from the plane of said engaging face of the support substantially the same distance as the working face of the first plunger, said second plunger having its part provided with said working face movable laterally toward and away from the contiguous portion of the first plunger, yielding means for forcing the laterally-movable part of the second plunger toward the contiguous portion of the first plunger, and means for moving both plungers toward and away from the support and for continuing the advance movement of the second plunger relatively to the first plunger after the movement of said first plunger is arrested, substantially as and for the purpose specified.

6. The combination of a plunger, a support having a substantially horizontal engaging face for coöperating with a working face of the plunger and arresting the movement of the plunger, said support also having a substantially vertical engaging face, a second plunger consisting of a main body, and an engaging part supported by the main body and movable on an axis relatively thereto, said engaging part being provided with a working face for coöperating with the substantially vertical face of the support and having the advance portion of its working face normally arranged in substantially the same horizontal plane as the working face of the first plunger, and said engaging part being movable laterally toward and away from the contiguous portion of the first plunger, yielding means for forcing said laterally-movable engaging part toward the contiguous portion of the first plunger, and means for moving both plungers toward and away from the support and for continuing the advance movement of the second plunger relatively to the first plunger after the movement of said first plunger is arrested, substantially as and for the purpose set forth.

7. The combination of a pair of supports, one being movable toward and away from the other, and a pair of plungers for each support, each pair of the plungers being movable toward and away from the corresponding support, and one of the plungers of each pair being movable relatively to the corresponding support after the other plunger of said pair assumes its operative position, substantially as and for the purpose set forth.

8. The combination of a pair of plungers, one being movable toward and away from the other, a pair of supports having engaging faces for coöperating respectively with working faces of the plungers and arresting the movement of said plungers, one support being movable toward and away from the other, a second pair of plungers, one being movable toward and away from the other, each of said second pair of plungers consisting of a main body, and an engaging part movable on an axis relatively to the main body and provided with a working face for coöperating with one of the supports, and each of said engaging parts having the advance portion of its working face normally separated from said engaging face of the corresponding support substantially the same distance as the working face of the other plunger coöperating with said support, and means for moving both pairs of plungers toward and away from the supports and for continuing the advance movement of the second pair of plungers relatively to the first pair of plungers after the working faces of said first pair of plungers have clamped upon the supports the article to be operated upon, substantially as and for the purpose specified.

9. The combination of a pair of supports, one being movable toward and away from the other, a pair of plungers for each support, the inner plunger of each pair of the plungers being movable toward and away from an opposing face of one of the supports and coöperating therewith, and the outer plunger of said pair having the part thereof provided with the working face of said plunger movable laterally toward and away from the contiguous portion of said inner plunger and movable along an outer side face of the support and coöperating therewith, and yielding means for forcing said laterally-movable parts of the outer plungers toward the contiguous portions of the inner plungers, substantially as and for the purpose set forth.

10. The combination of a pair of plungers, one being movable toward and away from the other, a pair of supports having engaging faces for coöperating respectively with working faces of the plungers and arresting the movement of said plungers, one support being movable toward and away from the other, a second pair of plungers, one being movable toward and away from the other, each of said second pair of plungers being provided with a working face coöperating with one of the supports and having the advance portion of its working face normally separated from the plane of said engaging face of the corresponding support substantially the same distance as the working face of the other plunger coöperating with said support, and each of said second pair of plungers having its part provided with said working face movable laterally toward and away from the contiguous portion of one of the first pair of plungers, yielding means for forcing the laterally-movable parts of the second pair of plungers toward the contiguous portions of the first pair of plungers, and means for moving both pairs of plungers toward and away from the supports and for continuing the advance movement of the second pair of plungers relatively to the first pair of plungers after the working faces of said first pair of plungers have clamped upon the supports the article to be operated upon, substantially as and for the purpose described.

11. The combination of a frame, a carriage movable on the frame, a pair of supports, one being fixed relatively to the frame and the other being fixed relatively to the carriage, and a pair of plungers for each support, each pair of the plungers being movable toward and away from the corresponding support, and one of the plungers of each pair being movable relatively to the corresponding support after the other plunger of said pair assumes its operative position, substantially as and for the purpose described.

12. The combination of a frame, a support projecting beyond the contiguous portion of the frame and movable lengthwise relatively to said portion of the frame, and means coöperating with said support for clamping the corner-stays thereupon, substantially as and for the purpose specified.

13. The combination of a frame, a support projecting beyond the contiguous portion of the frame and movable lengthwise relatively to said portion of the frame, and a pair of plungers movable toward and away from the support, one of the plungers being movable relatively to the support after the other plunger assumes its operative position for forcing the engaging face of said one of the plungers beyond the engaging face of said other plunger when in its operative position, substantially as and for the purpose specified.

14. The combination of a frame, a support projecting beyond the contiguous portion of the frame and movable lengthwise relatively to said portion of the frame, and a pair of plungers, one being movable toward and away from an opposing face of the support and the other being movable along a second face of the support, substantially as and for the purpose set forth.

15. The combination of a frame, a pair of supports projecting beyond the contiguous portion of the frame and movable lengthwise relatively to said portion of the frame, one of the supports being capable of additional movement toward and away from the other, and means coöperating with each support for clamping the corner-stays upon said supports, substantially as and for the purpose described.

16. The combination of a frame, a pair of supports projecting beyond the contiguous portion of the frame and movable lengthwise relatively to said portion of the frame, one of the supports being capable of additional movement toward and away from the other, a pair of plungers for each support, the inner plunger of each pair of plungers being movable toward and away from an opposing face of one of the supports and coöperating therewith, and the outer plunger of said pair having the part thereof provided with the working face of said plunger movable laterally toward and away from the contiguous portion of said inner plunger and movable along an outer side face of the support and coöperating therewith, and yielding means for forcing said laterally-movable parts of the outer plungers toward the contiguous portions of the inner plungers, substantially as and for the purpose set forth.

17. The combination of a rotary feeding member for engaging the adhesive strip journaled in fixed bearings, a rocking part, means actuated by the rocking part for intermittently advancing the rotary feeding member, and a rotary shaft connected to the rocking part for actuating the same, substantially as and for the purpose described.

18. The combination of a rotary feeding member for engaging the adhesive strip, a gear-wheel connected to the feeding member by a pawl-and-ratchet wheel, a rocking toothed segment for engaging the gear-wheel, a pivoted lever, and a link having one end connected to the segment and its other end connected to the lever and adjustable lengthwise thereof, substantially as and for the purpose described.

19. The combination of a spindle having reversely-threaded portions, separable roller-sections for guiding a strip of adhesive material, said sections being respectively adjustable lengthwise of said reversely-threaded portions of the spindle and having their outer sides provided with peripheral flanges, and their contiguous faces respectively provided with a socket and a dowel-pin projecting into the socket, a nut on the spindle for engaging one of the sections and holding said sections in position, and means for attaching said strip in position, substantially as and for the purpose specified.

5   In testimony whereof I have hereunto signed my name, in the presence of two attesting witnesses, at Rochester, in the county of Monroe, in the State of New York, this 18th day of December, 1901.

WILLIAM F. MORSE.

Witnesses:
   WILLIAM F. PARRY,
   CHARLES J. TONER.